United States Patent
Zhao et al.

(10) Patent No.: US 11,048,356 B2
(45) Date of Patent: Jun. 29, 2021

(54) MICROPHONE ON CONTROLLER WITH TOUCHPAD TO TAKE IN AUDIO SWIPE FEATURE DATA

(71) Applicant: Sony Interactive Entertainment LLC, San Mateo, CA (US)

(72) Inventors: Cen Zhao, San Mateo, CA (US); Chung-Hsien Yu, San Mateo, CA (US); Samuel Ian Matthews, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/527,885

(22) Filed: Jul. 31, 2019

(65) Prior Publication Data

US 2021/0034187 A1  Feb. 4, 2021

(51) Int. Cl.
| | | |
|---|---|---|
| G06F 3/041 | (2006.01) | |
| G06N 3/08 | (2006.01) | |
| G06F 3/16 | (2006.01) | |
| G06F 3/01 | (2006.01) | |

(52) U.S. Cl.
CPC ............ *G06F 3/0416* (2013.01); *G06F 3/018* (2013.01); *G06F 3/167* (2013.01); *G06N 3/08* (2013.01)

(58) Field of Classification Search
CPC . G06F 3/002; G06F 3/005; G06F 3/01; G06F 3/017; G06F 3/018; G06F 3/0231; G06F 3/0233; G06F 3/0235; G06F 3/0237; G06F 3/0416; G06F 3/04162; G06F 3/048; G06F 3/0487–04886; G06F 3/04897; G06F 3/167; G06F 2203/0381; G06N 3/02; G06N 3/08–088

See application file for complete search history.

(56) References Cited

U.S. PATENT DOCUMENTS

| | | | | |
|---|---|---|---|---|
| 5,680,510 A | * | 10/1997 | Hon | ................ G10L 15/142 704/255 |
| 2009/0213081 A1 | | 8/2009 | Case, Jr. | |
| 2009/0324082 A1 | * | 12/2009 | Liu | ................ G06K 9/00416 382/185 |
| 2010/0138221 A1 | * | 6/2010 | Boys | ................ G10L 15/28 704/235 |

(Continued)

FOREIGN PATENT DOCUMENTS

WO  2015192117 A1  12/2015

OTHER PUBLICATIONS

Zhao et al., "Game Controller with Touchpad Input", file history of related U.S. Appl. No. 16/396,379, filed Apr. 26, 2019.

(Continued)

*Primary Examiner* — Nathan Danielsen
(74) *Attorney, Agent, or Firm* — John L. Rogitz

(57) ABSTRACT

A game controller includes a touchpad that a user, viewing a virtual keyboard on a screen, can soft-touch to move a cursor on the screen and then hard-touch to move the cursor and also send location data to a processor for inputting a letter from the virtual keyboard. A microphone on the touchpad can be used to receive voice signals for training a machine learning module to predict a next letter or next word, or to insert special characters/punctuations/graphics such as "smileys" during the swipe, or to indicate a tone of a Chinese character while typing with Chinese Pinyin.

17 Claims, 19 Drawing Sheets

(56) References Cited

U.S. PATENT DOCUMENTS

| | | | |
|---|---|---|---|
| 2011/0118026 A1* | 5/2011 | Lukas | A63F 13/06 463/37 |
| 2015/0205781 A1* | 7/2015 | Feng | G06F 40/129 704/9 |
| 2017/0017393 A1 | 1/2017 | Luo et al. | |
| 2018/0137412 A1* | 5/2018 | Nikkhah | G06N 3/084 |
| 2019/0034416 A1 | 1/2019 | Hasan et al. | |
| 2019/0057306 A1 | 2/2019 | Xue et al. | |

OTHER PUBLICATIONS

International Search Report and Written Opinion dated Aug. 27, 2020, from the counterpart PCT application PCT/US2020/041422.

* cited by examiner

MICROPHONE ON CONTROLLER WITH TOUCHPAD TO TAKE IN AUDIO SWIPE FEATURE DATA

FIELD

The application relates generally to technically inventive, non-routine solutions that are necessarily rooted in computer technology and that produce concrete technical improvements. In particular, the present application relates to computer simulation controllers with touchpad input.

BACKGROUND

Machine learning, sometimes referred to as deep learning, can be used for a variety of useful applications related to data understanding, detection, and/or classification.

SUMMARY

In computer simulation industries such as gaming industries, multiple data entry modes may exist that can benefit from machine learning to increase precision and robustness.

Present principles thus provide a microphone on a touchpad of a computer simulation controller that can be used to receive voice signals for training a machine learning module to predict a next letter or next word, or to insert special characters/punctuations/graphics such as "smileys" during the swipe, or to indicate a tone of an Asian word character such as a Chinese character while typing with Chinese Pinyin.

Accordingly, an apparatus includes at least one processor and at least one computer storage that is not a transitory signal and that includes instructions executable by the processor to receive a touch signal from a touch surface of a computer simulation controller to identify a first alpha-numeric character. The instructions are executable to input the first alpha-numeric character to at least a first neural network (NN), and receive from the first NN a predicted sequence of alpha-numeric characters including at least a first predicted alpha-numeric character for presentation on at least one display. The instructions also are executable to receive, from at least one microphone, input indicating acceptance or rejection of at least the first predicted alpha-numeric character and provide the input from the microphone to the first NN to train the first NN. The first NN may include plural long short-term memory (LSTM) networks.

In example embodiments, the processor and microphone are embodied in the computer simulation controller. In other embodiments the processor may be embodied in a computer simulation console configured for communicating with the computer simulation controller.

In some implementations, the instructions can be executable to identify at least one punctuation symbol using the input from the microphone, and responsive to identifying the punctuation symbol, present the punctuation symbol on the display.

In some implementations, the instructions can be executable to identify at least one tone using the input from the microphone, and responsive to identifying the tone, identify for presentation on the display at least one Chinese Pinyin character. In such implementations, the instructions may be executable to receive from the touch surface indication of at least two Arabic letters. The instructions further may be executable to identify, using the Arabic letters, at least first and second candidate Chinese words, and responsive to identifying the tone, select the first Chinese word but not the second Chinese word.

In another aspect, an apparatus includes at least one processor and at least one computer storage that is not a transitory signal and that includes instructions executable by the processor to identify at least one tone using input from a microphone, and responsive to identifying the tone, identify for presentation on a display at least one Asian language character.

In another aspect, an apparatus includes at least one processor and at least one computer storage that is not a transitory signal and that includes instructions executable by the processor to identify at least one punctuation symbol using input from a microphone, and responsive to identifying the punctuation symbol, present the punctuation symbol on a display.

The details of the present application, both as to its structure and operation, can best be understood in reference to the accompanying drawings, in which like reference numerals refer to like parts, and in which:

DETAILED DESCRIPTION

Figure 1:
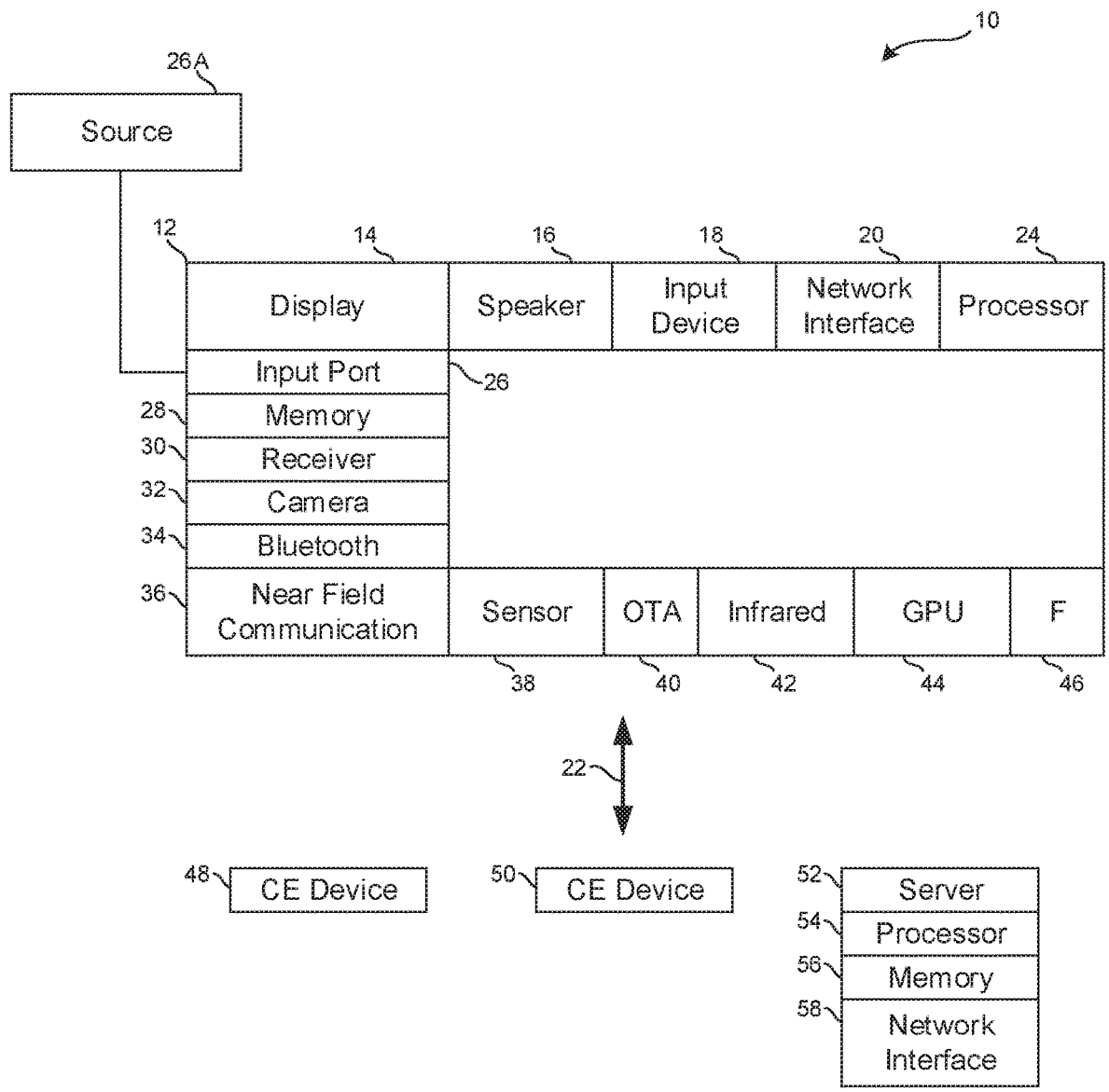
FIG. 1 is a block diagram of an example system consistent with present principles.

Now referring to FIG. 1, this disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles.

Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
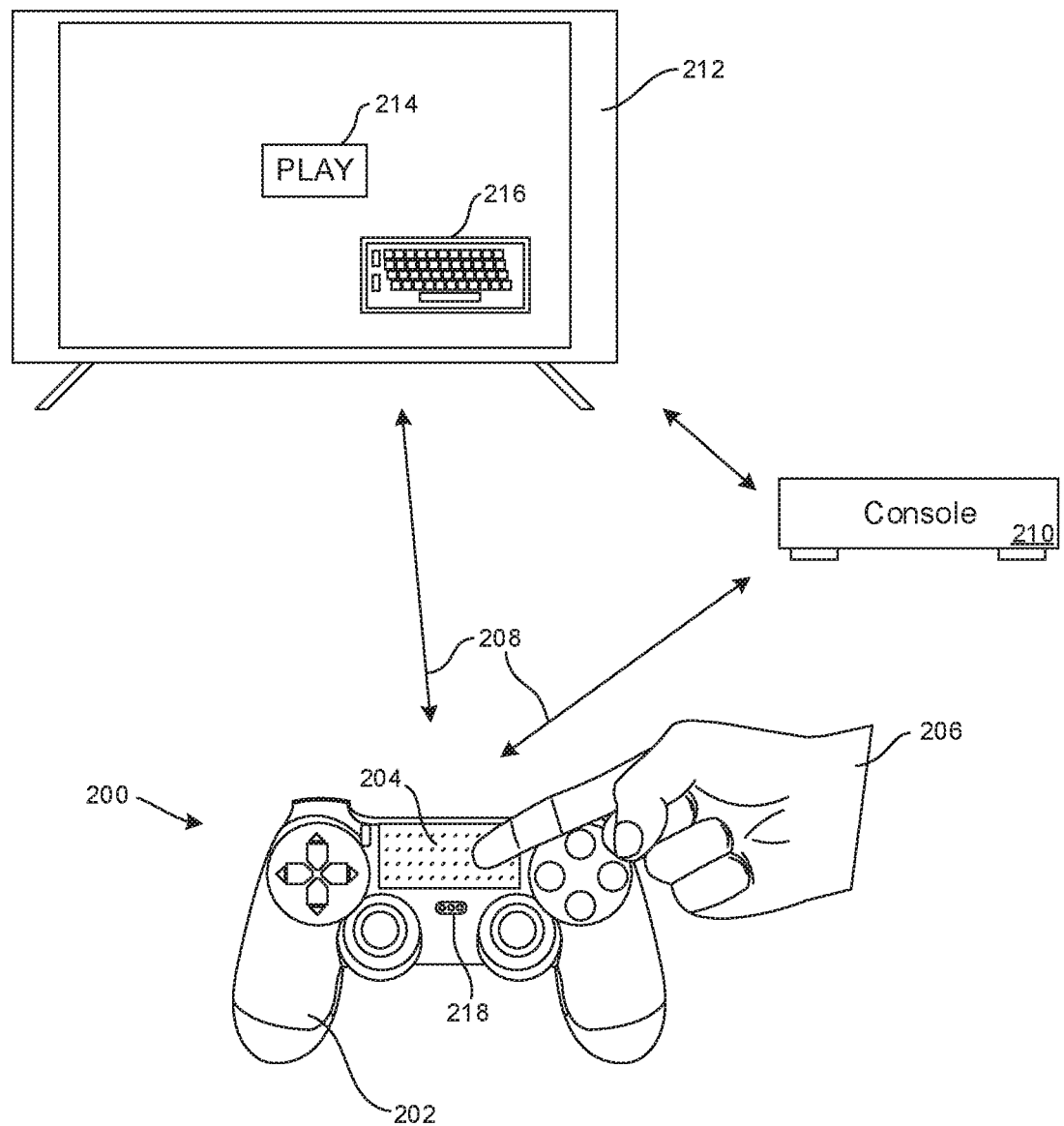
FIG. 2 is a perspective view of a computer simulation controller with a microphone and a touch pad being used for inputting text presented on a display such as a TV or other audio video device communicating with the game controller directly or via, e.g., a computer game console.

FIG. 2 illustrates a system 200 the components of which may incorporate appropriate components shown in FIG. 1. A computer simulation controller 202 such as a PlayStation® controller, Xbox® controller, or other controller may include a touchpad 204 that can receive touch signals from a hand 206 and communicate via wired and/or wireless paths 208 with a computer simulation console 210 and/or a display device 212 such as an Internet-enabled TV. As explained further below, the user can manipulate the touchpad 204 to generate alpha-numeric characters 214 for presentation on the display device 212 either through direct communication of signals with the display device or through the simulation console 210. More specifically, by manipulating the touchpad 204, a user can move a screen cursor over a letter on a virtual keyboard 216 presented on the display device 212 to enter the alpha-numeric characters 214. The virtual keyboard 216 may have, without limitation, a QWERTY layout.

Additionally, the controller 200 may include one or more microphones 218 communicating with the processor of the controller for purposes disclosed below. In the example shown, the microphone 218 is provided on the touchpad 204, although it is to be understood that the microphone 218 may be provided elsewhere on the housing of the controller 200 or indeed on another component if desired.

Figure 3:
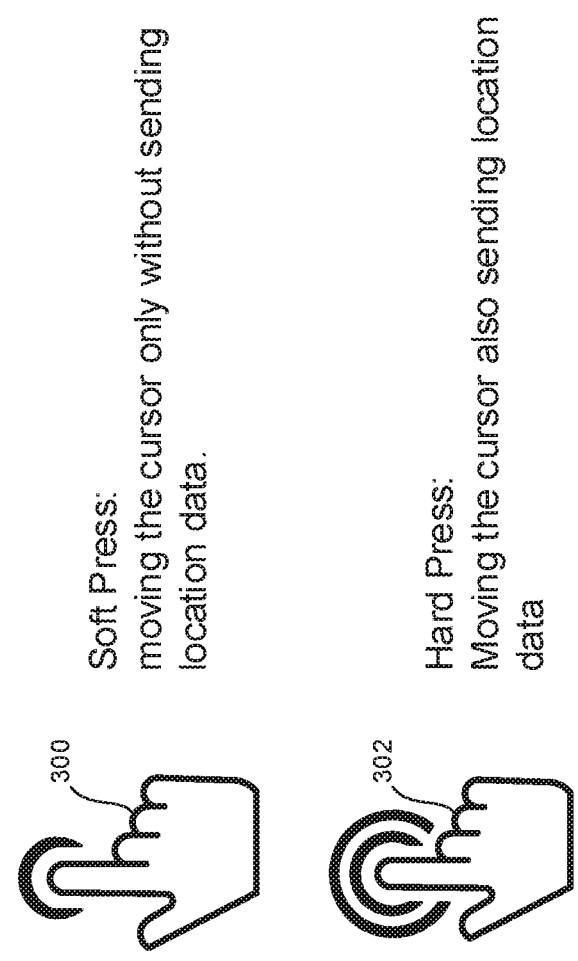
FIG. 3 is a schematic diagram illustrating a soft press and a hard press on the controller touch pad.

As shown schematically in FIG. 3, present principles contemplate two types of touch, namely, a "soft" press 300 (using a soft pressure on the touchpad or a hover over the touchpad with zero pressure), in which a screen cursor on the display device 212 is moved to desired locations on the virtual keyboard 216 without sending location data (i.e., a signal indicating selection of any particular virtual key) to the display device, and a "hard" press 302 of greater pressure than a soft press, in response to which a screen cursor on the display device 212 may be moved and location data sent to the display device to indicate selection of a virtual key. In this way, a user can look away from the touchpad 204 and view the virtual keyboard 216 while moving his or her finger across the touchpad to move a visible screen cursor to a desired letter on the virtual keyboard, and then exert a hard press to select that letter. Note that an individual "next" letter may not be presented on the display, but rather the next "most possible word" may be displayed after a user has finished a "swipe". The "hottest" key (based on the heatmap) may be highlighted on the virtual keyboard as well as the trace. In addition, a "swipe" is defined as a continuous hard-press which forms a trace.

Figure 4:
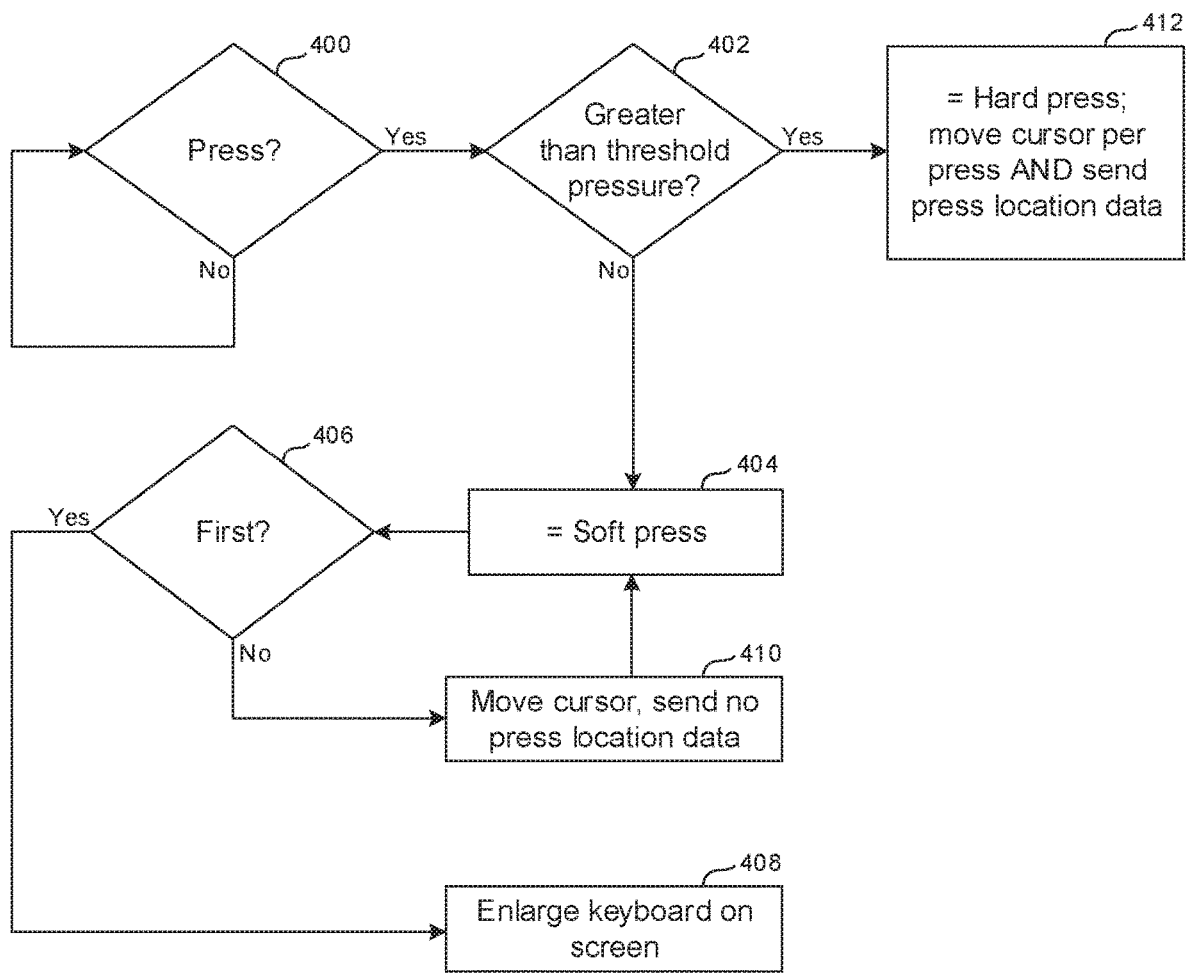
FIG. 4 is a flow chart of example logic consistent with present principles related to FIG. 3.

FIG. 4 illustrates example logic with the above description in mind. The logic may be executed by one or more of a processor in the simulation controller 202, a processor in the simulation console 210, and a processor in the display device 212.

Commencing at state 400 it is determined whether a press of the touchpad 204 has been received. This may be done by determining whether signals from one or more proximity sensors associated with the touchpad 204 indicate a hover of a finger adjacent the touchpad 204 and/or by determining whether signals from one or more pressure sensors associated with the touchpad 204 indicate a pressure of at least a first threshold pressure.

When it is determined that a touch has been received, the logic proceeds to state 402 to determine whether the touch is a soft press or hard press as indicated by, e.g., signals from a pressure sensor associated with the touchpad 204 indicating a touch of at least a threshold pressure, which is typically set to be greater than any threshold pressure used at state 400. If the touch does not satisfy the threshold, the logic moves to block 404 to return a soft press. In some implementations the logic may proceed to state 406 to determine whether the soft press is the first soft press within, e.g., a threshold of period, for example within the last five minutes, and if so the logic can move to block 408 to enlarge an image of the virtual keyboard 216 on the display device 212. In any case, from state 406 if the test there is negative or from block 408, the logic moves to block 410 to move the screen cursor without sending press location information.

On the other hand, if the test at state 402 determines that a hard press is received, such is returned at block 412, and the screen may be moved according to the touch with location information being sent as well indicating the location of the virtual keyboard the user has selected by means of the hard press on the touchpad 204 of the simulation controller 200.

Figure 5:
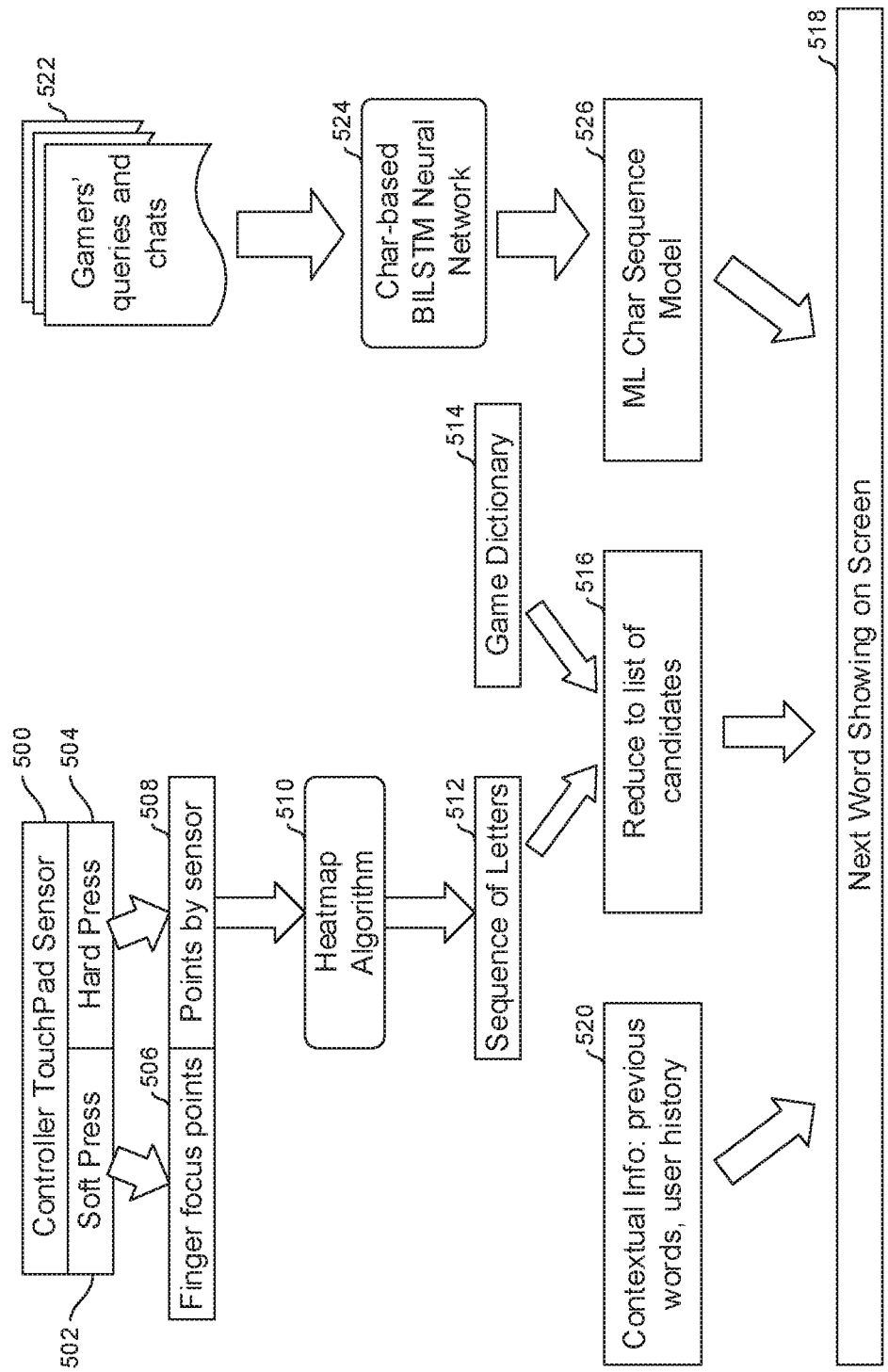
FIG. 5 is a combination of a logic flow chart, data structures, and processing components consistent with present principles.

FIG. 5 illustrates a combination of hardware and software blocks alluded to above.

One or more proximity and/or pressure sensors 500 are provided in the touchpad 204 to output signals representing soft presses 502 and hard presses 504. The soft presses 502 establish finger focus points 506. The hard presses 504 establish points on the touchpad as detected by the sensor(s) 500. A soft-press represents a cursor focus point, while "points by sensor" means "continuous points sending by the sensor".

Figure 6:
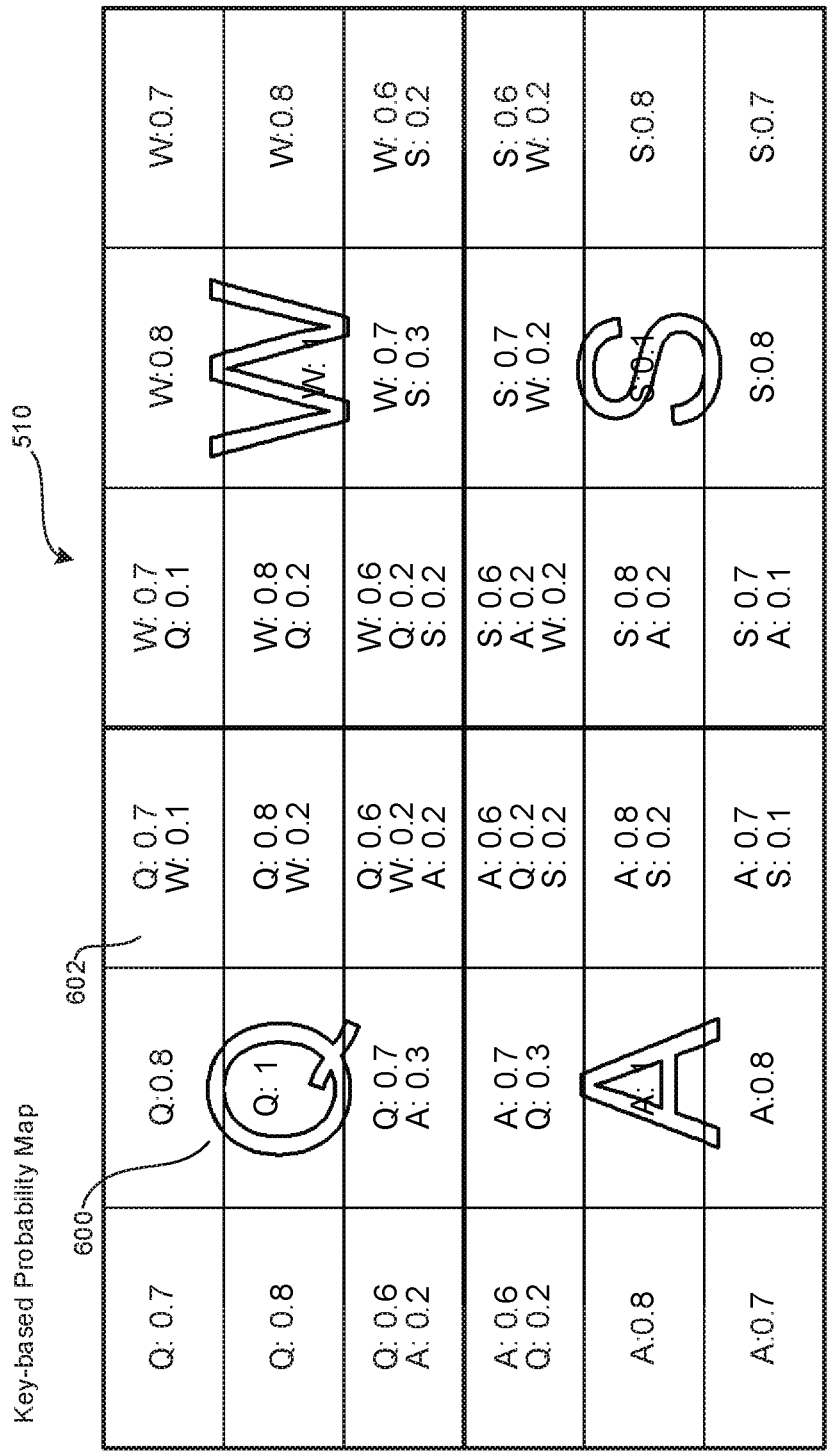
FIGS. 6-8B are schematic diagrams of a data structure referred to as the heat map in FIG. 5, illustrating steps in use.
Figure 7:
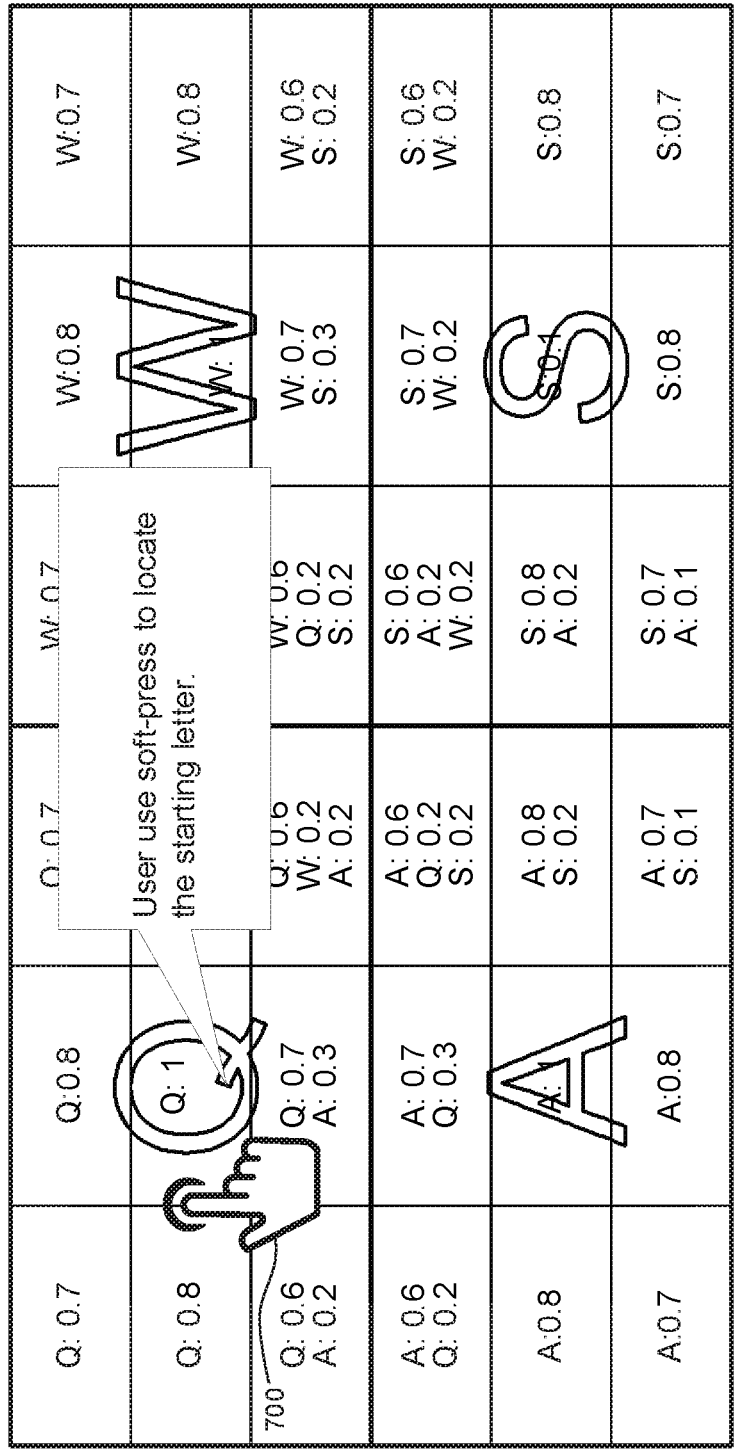
Figure 8:
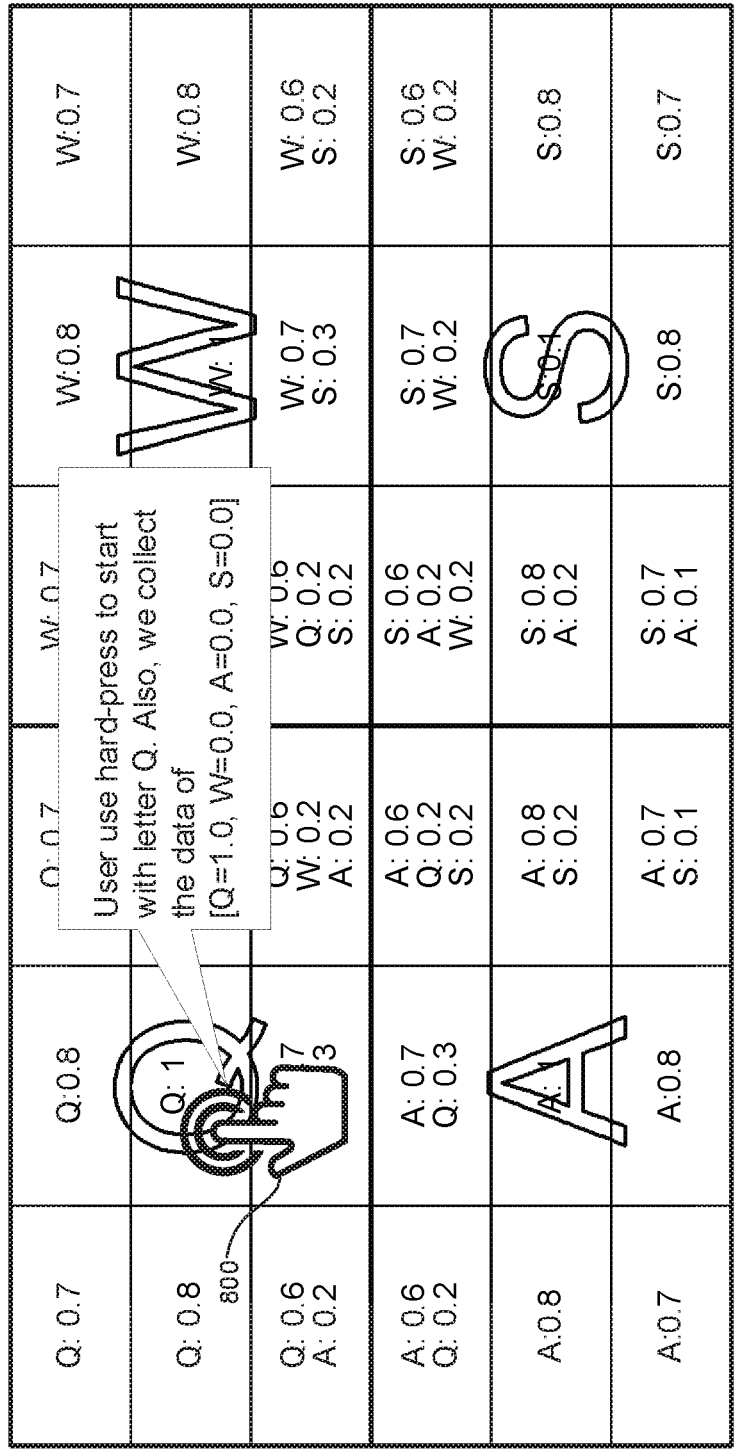

At 510 a heatmap algorithm, discussed further below in reference to FIGS. 6-8, is accessed to output a sequence of letters 512 according to the hard presses 504. The sequence of letters 512 is input along with a dictionary 514 to a reduction block 516 that reduces the list of candidates that might possibly form either a correction to or a completion of the sequence of letters 512. The dictionary 514 is essentially a dictionary and/or thesaurus of sequences of letters that can be used to correct a mis-typed word, e.g., the dictionary 514 may correlate "thw" to "the" to return the word "the" in response to input of "thw".

The reduced list of candidates 516 is provided to a module 518 that outputs a predicted network or words for presentation on the screen, which a user can then select to complete his or her desired input without typing every letter of the predicted word or words. The module 518 may be established by one or more neural networks (NN) as described further below. To produce a predicted word or words, the module 518 may receive input from a contextual user block 520, which provides previous word strings employed by the user with the current input inferred to possibly be a repeat of a prior input, e.g., "do you" may have been followed multiple times in prior inputs by "know what I mean", and this information can be input to help train and execute the module 518.

Moreover, similar training/execution aids may be input to the module 518 as shown at the right of FIG. 5. Specifically, queries and chat data 522 from other computer gamers may be input to a character-based NN such as a bidirectional long short-term memory (BILSTM) 524 to learn patterns of common input strings for provision to a machine learning character sequence model 526. This model 526 may be input to or accessed by the module 518 in rendering a next predicted word or words.

FIGS. 6-8B illustrate employment of the heatmap algorithm 510 in FIG. 5. Basically, the "path" or "connected points" of the finger "swipe" (hard-press) and the probabilities of each letter are "discounted and accumulated" at certain time interval along the swipe. At each time interval, the letter with the highest probability is extracted, which may also have to pass a certain threshold to add to the sequence as developed further below.

In FIGS. 6-8B, it is to be understood that only the first four letters in the top left corner of a QWERTY keyboard (i.e., Q, next to which is "W", and below which from left to right are "A" and "S") are shown for clarity of disclosure, as but one example of a possible virtual keyboard layout for the virtual keyboard 216. In the example heatmap 510 illustrated, each area of the heatmap for a particular letter is divided into a three-by-three grid for nine divisions (illustrated as geometric squares) total, with the center division 600 for a particular letter indicating that the probability of that letter being desired when a cursor is in the center area being 1. In contrast, the heatmap 510 indicates probabilities less than one but greater than zero in the border divisions 602 that surround the center division 600 of a letter, with the probabilities being associated with the letter of the center division 600 and the letter(s) immediately adjacent the border divisions 602 (or, in the case of a border division that is not adjacent another letter, only a probability less than one for the letter of the center division).

As shown in FIG. 7 at 700, a soft press is used to locate the starting letter of an intended input. Then, as shown at 800 in FIG. 8, a hard press is used to indicate selection of the starting letter, in the example shown, "Q". This causes the collection of data that "Q" is selected with a probability of one and that surrounding letters (in the example shown, "W", "A", and "S") are not selected, i.e., have a probability of zero.

Figure 8A:
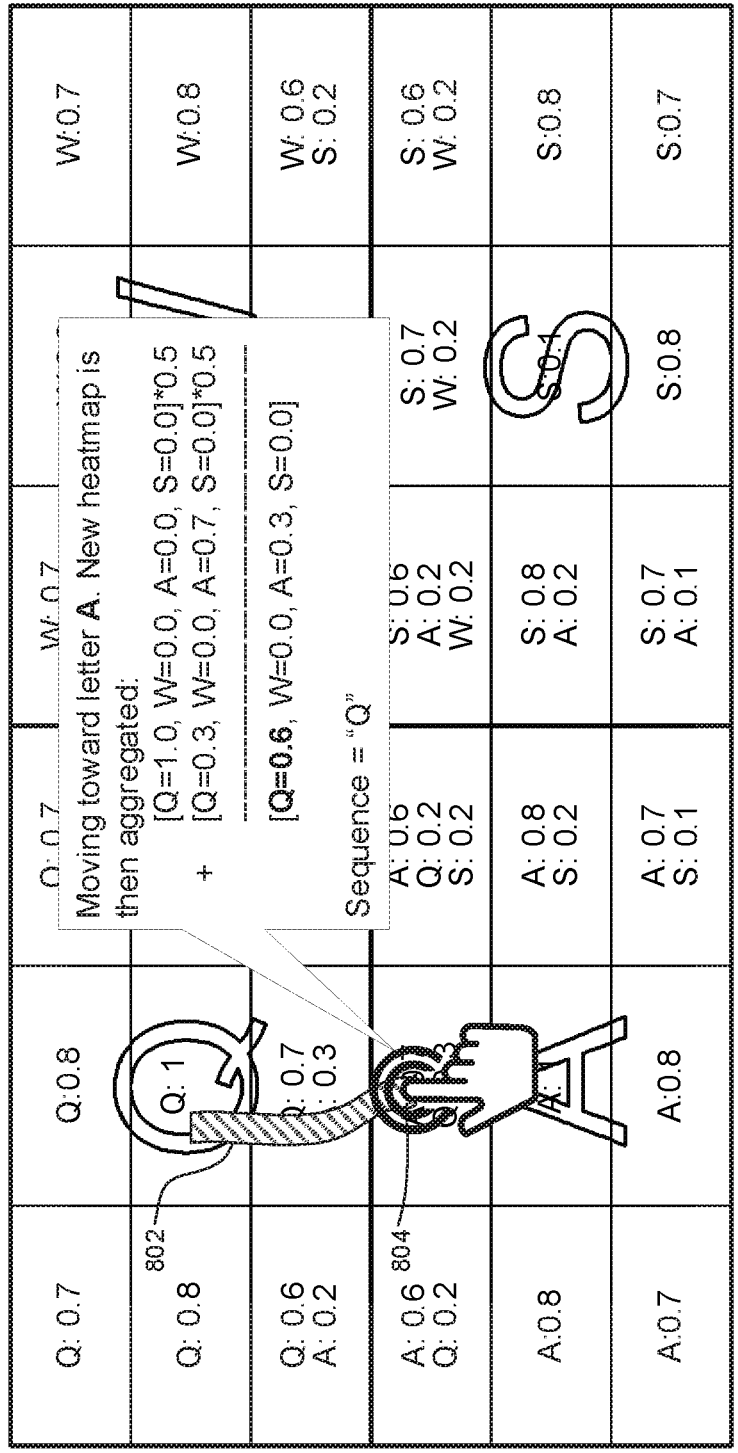
Figure 8B:
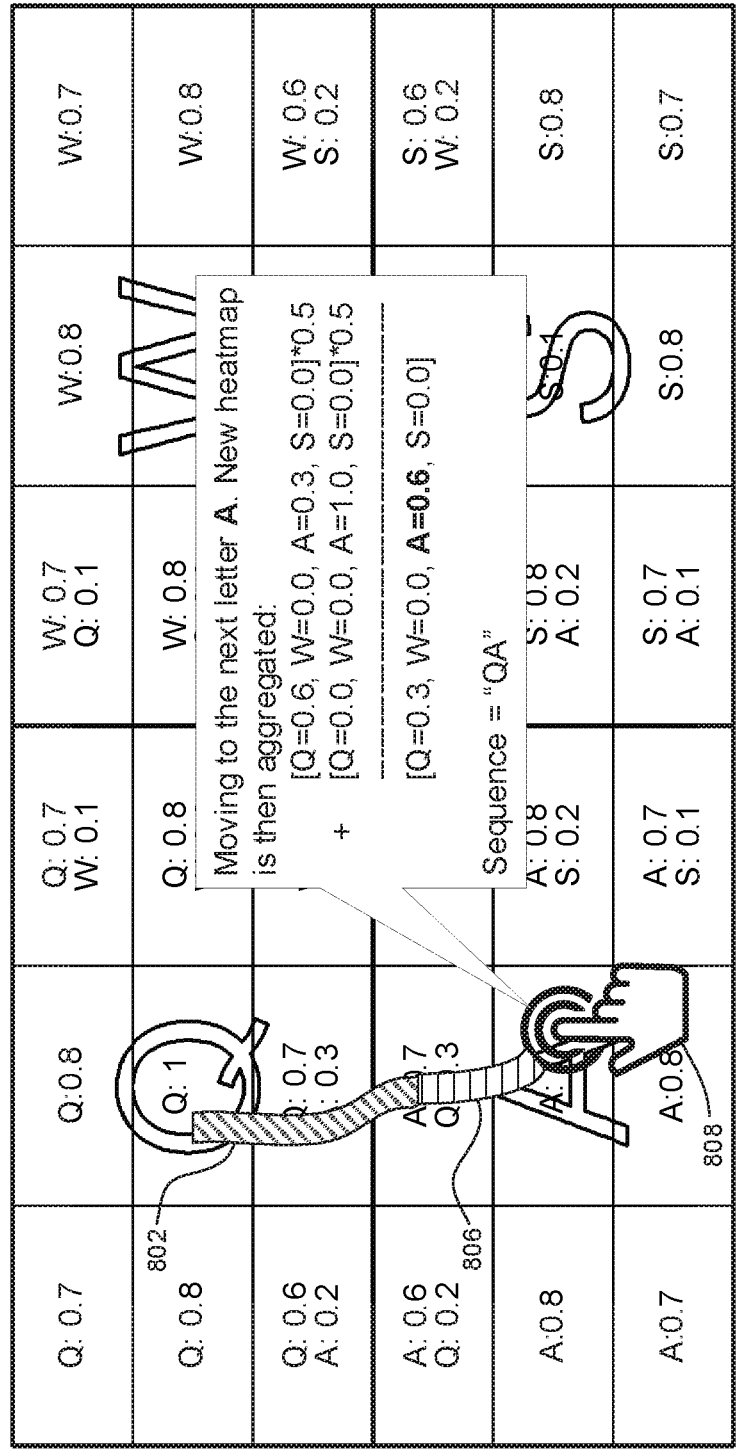

FIGS. 8A and 8B illustrate the results of an ensuing swipe. In FIG. 8A a swipe is shown at 802 from the location starting in FIG. 8 to the location 804 indicated by the image of the hand. Here, the user has moved his finger toward the letter "A". This causes new heatmap statistics to be aggregated according to the path of the swipe over the border divisions 602 using the algorithm shown in FIG. 8A. Because the probability of "Q" is higher than the probabilities of "W" (which is zero), "A" (which is 0.3), and "S" (which is zero), the sequence returns "Q".

FIG. 8B shows at 806 that the swipe has been continued to the location 808 shown by the image of the hand. This causes further heatmap statistics to be aggregated according to the path of the swipe over the border divisions 602 using the algorithm shown in FIG. 8B. Because the probability of "A" is higher than the probabilities of "W" (which is zero), "Q" (which is 0.3), and "S" (which is zero), the sequence returns "A" to be appended after "Q" was returned in FIG. 8A, resulting in a sequence "QA".

Thus, it may now be appreciated that the "path" or "connected points" of the finger "swipe" (hard-press) is tracked and the probabilities of each letter are discounted and accumulated at certain time intervals along the swipe. At each time interval, the letter with the highest probability is extracted, in some embodiments provided the probability of the letter satisfies a threshold probability (e.g., of 0.4) to be added to the sequence.

Figure 9:
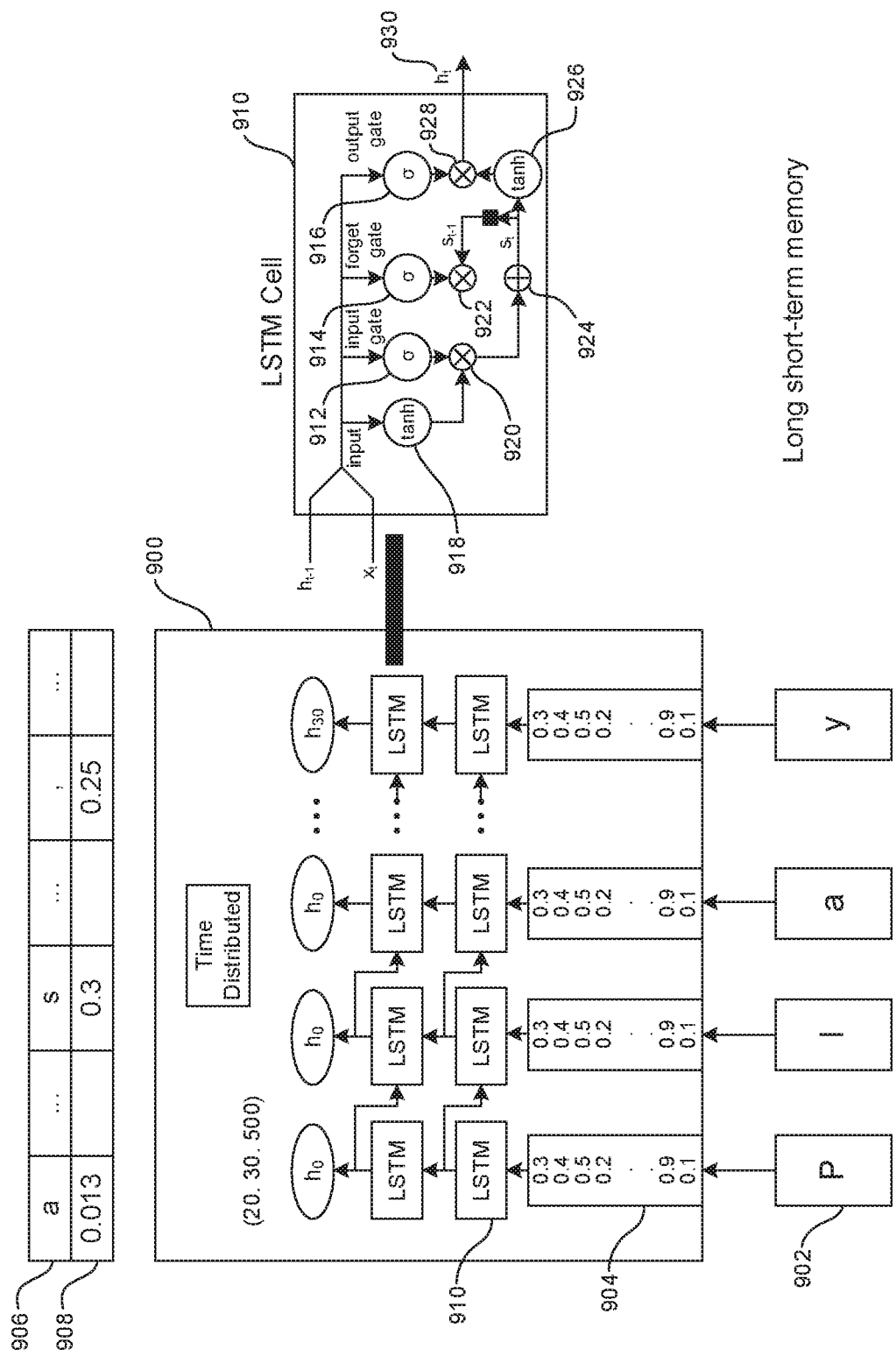
FIG. 9 is a block diagram of an example neural network (NN) configured as plural long short-term memory (LSTM) networks for outputting a predicted next word based on current user input.

FIG. 9 illustrates an example NN architecture that may be used in any of the NN-based modules of, e.g., FIG. 5. A network 900 of NN may receive input letters 902 with probabilities 904 from the heatmap to output time-distributed predicted letters 906 with associated probabilities 908. In the example shown, each letter 902 may be input to a respective recurrent NN (RNN) such as a sequence of long short-term memory (LSTM) 910 as shown. An LSTM 910 as shown at the right in FIG. 9 may include an input gate 912, a forget gate 914, and an output gate 916, all of which may execute a sigmoid function as indicated by the Greek letter a in FIG. 9. The input gate 912 controls the extent to which a new value flows into the cell, the forget gate 914 controls the extent to which a value remains in the cell and the output gate 916 controls the extent to which the value in the cell is used to compute the output activation of the LSTM unit.

The current value $x_i$ being input and the hidden state $h_{t-1}$ from the previous iteration are input to all three gates as shown. The output of the sigmoid function of the input gate 912 may be combined with a hyperbolic tangent function 918 at a first combine operator 920, which may be an element-wise product. The output of the first combine operator 920 is combined, as by summing if desired, with the output of s second combine operator 922 at a third combine operator 924. The output of the third combine operator 924 may be fed back to the second combine operator 922 for combining with the output of the forget gate 914. Further, the output of the third combine operator 924 may be operated on if desired by a hyperbolic tangent function 926 and then combined at a fourth combine operator 928 with the output of the output gate 916 to render a hidden state vector 930 for use in the succeeding iteration.

Figure 10:
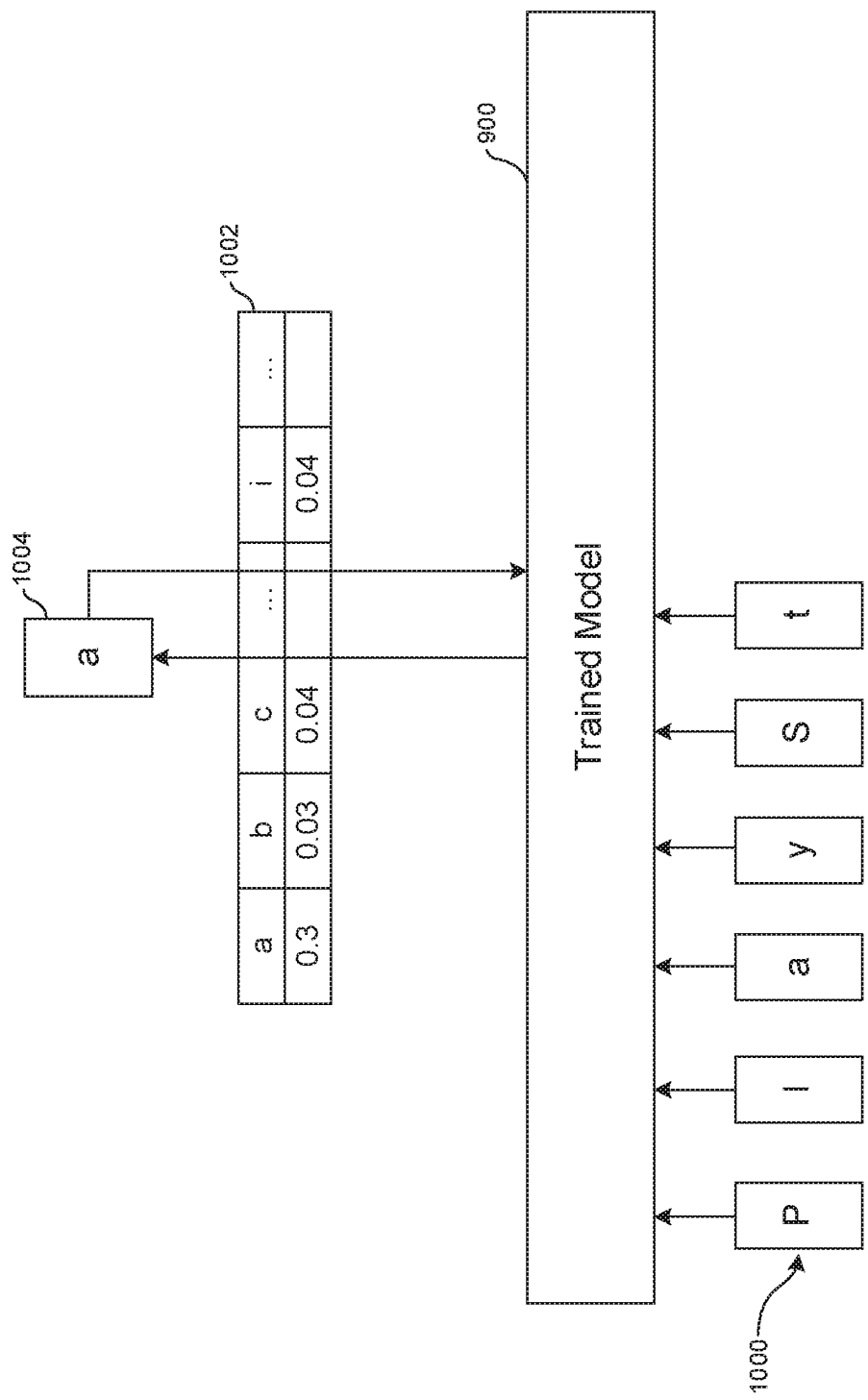
FIGS. 10-12 are schematic diagrams illustrating operation of the NN in FIG. 9 post-training.
Figure 11:
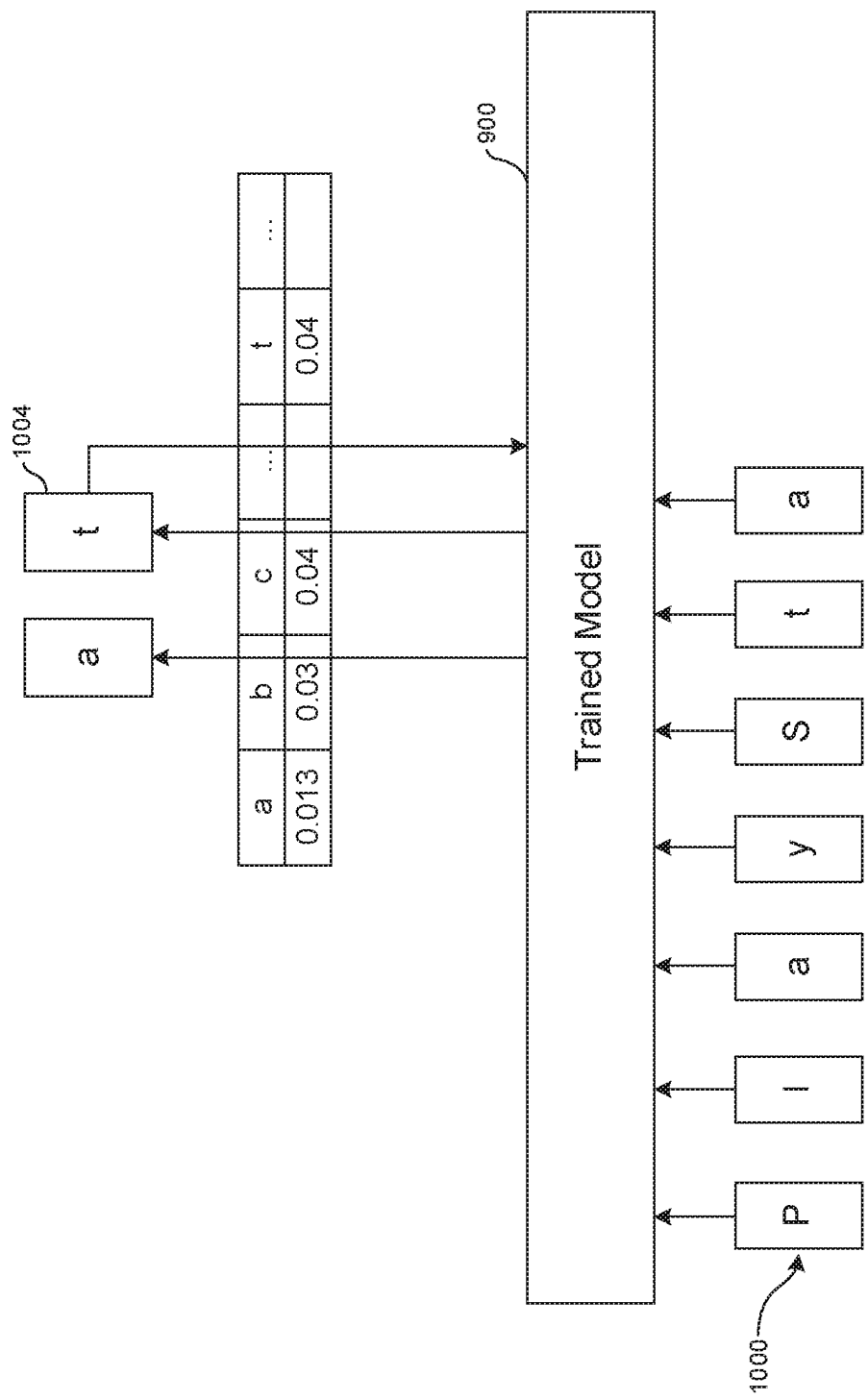
Figure 12:
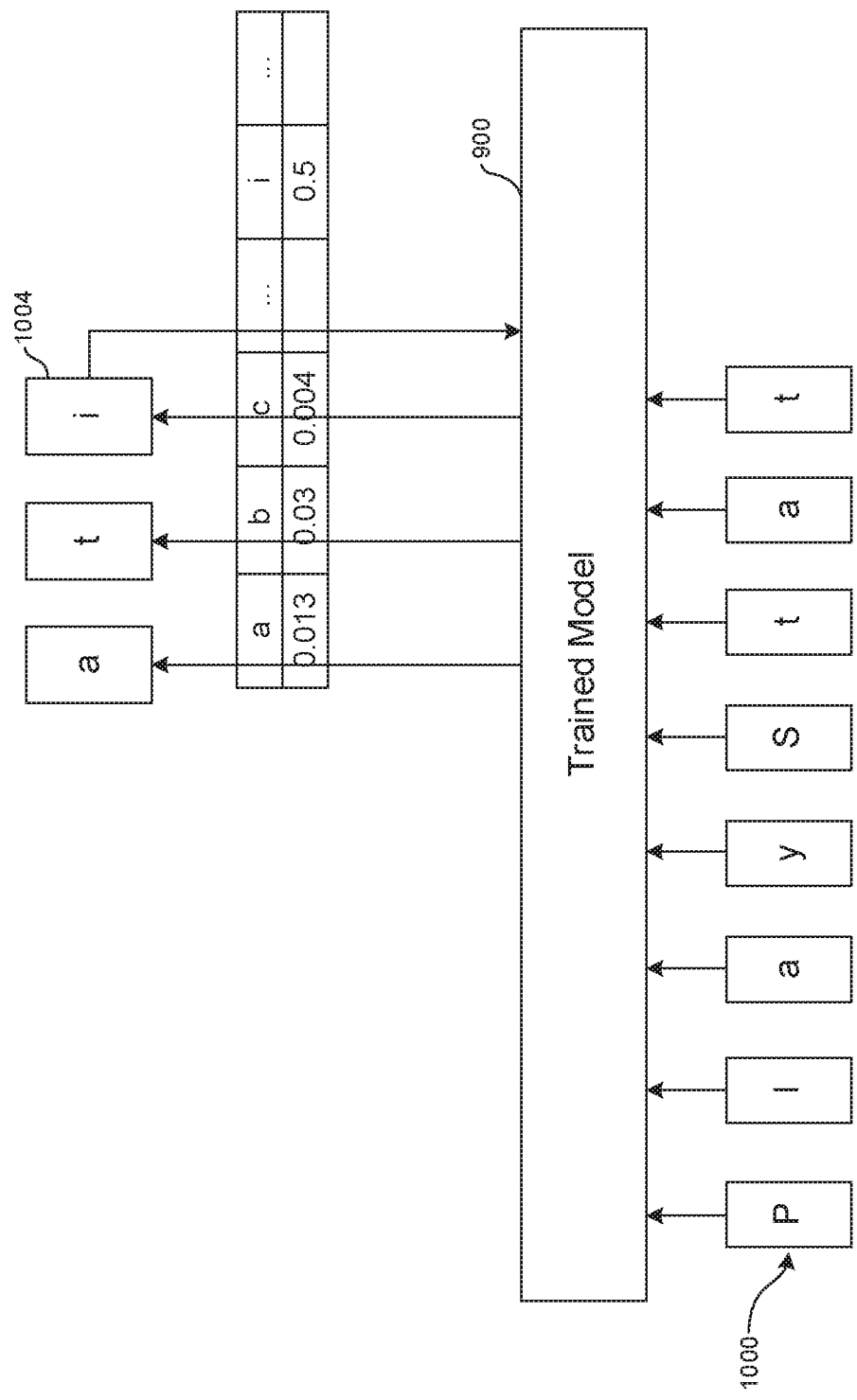

FIGS. 10-12 illustrate a sequence of the use of the network 900 to generate predicted text. The lower row of letters 1000 represents input received from hard presses on keys of the virtual keyboard 216 and/or from selection of previously predicted letters and/or words. These are input to the trained network 900. Using probabilities correlated with letters from the heatmap as illustrated at 1002, a next predicted letter 1004 is generated and fed back to the model. The sequence shown in FIGS. 10-12 generated predicted letters for an initial input of "play" that results in the word "PlayStation".

Figure 13:
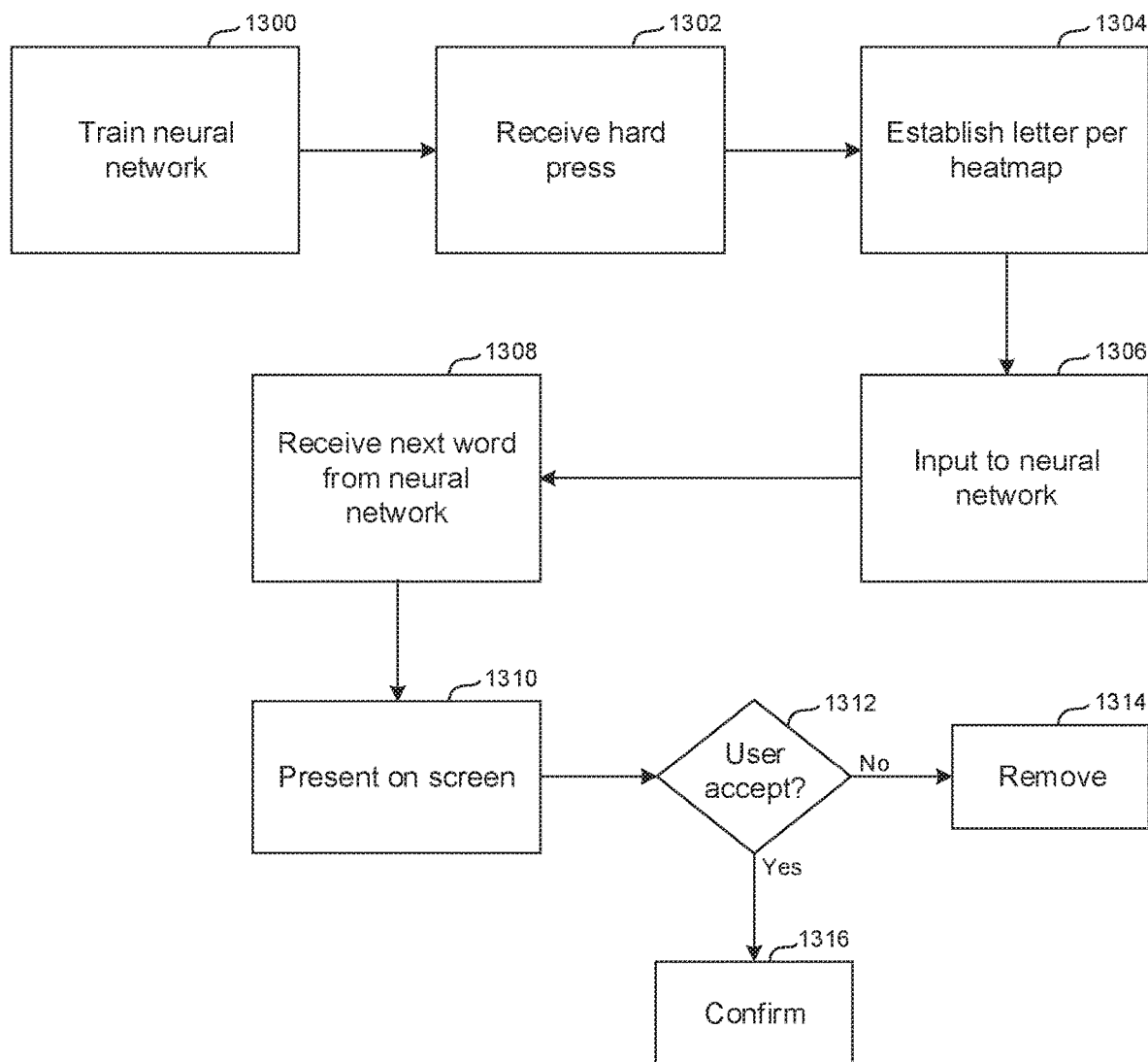
FIG. 13 is a flow chart of example overall logic consistent with present principles.

FIG. 13 is a flow chart of example logic consistent with present principles. The NN system(s) described herein are trained at block 1300. Moving to block 1302, a hard press is received on the touchpad and a letter established based thereon at block 1304 using the heatmap if desired. The letter is input to the NN system at block 1306, which outputs a predicted letter or words or string of words at block 1308. The predicted letters/words are presented on screen at block 1310.

If a user does not accept the predictions at state 1312, they may be removed from presentation at state 1314. Otherwise, accepted predictions are confirmed at block 1316 and presented in sequence after the letters established by the hard press.

Present principles may be used in all possible deep learning-based methods for image, video and audio data processing, among others.

Note that a user can indicate acceptance at state 1312 by speaking into the microphone 218 illustrated in FIG. 2. For example, the user may speak "OK" to accept the predicted word or "not right" or equivalent to reject it. This input is provided to the neural networks described herein as ground truth data for training the neural networks.

Figure 14:
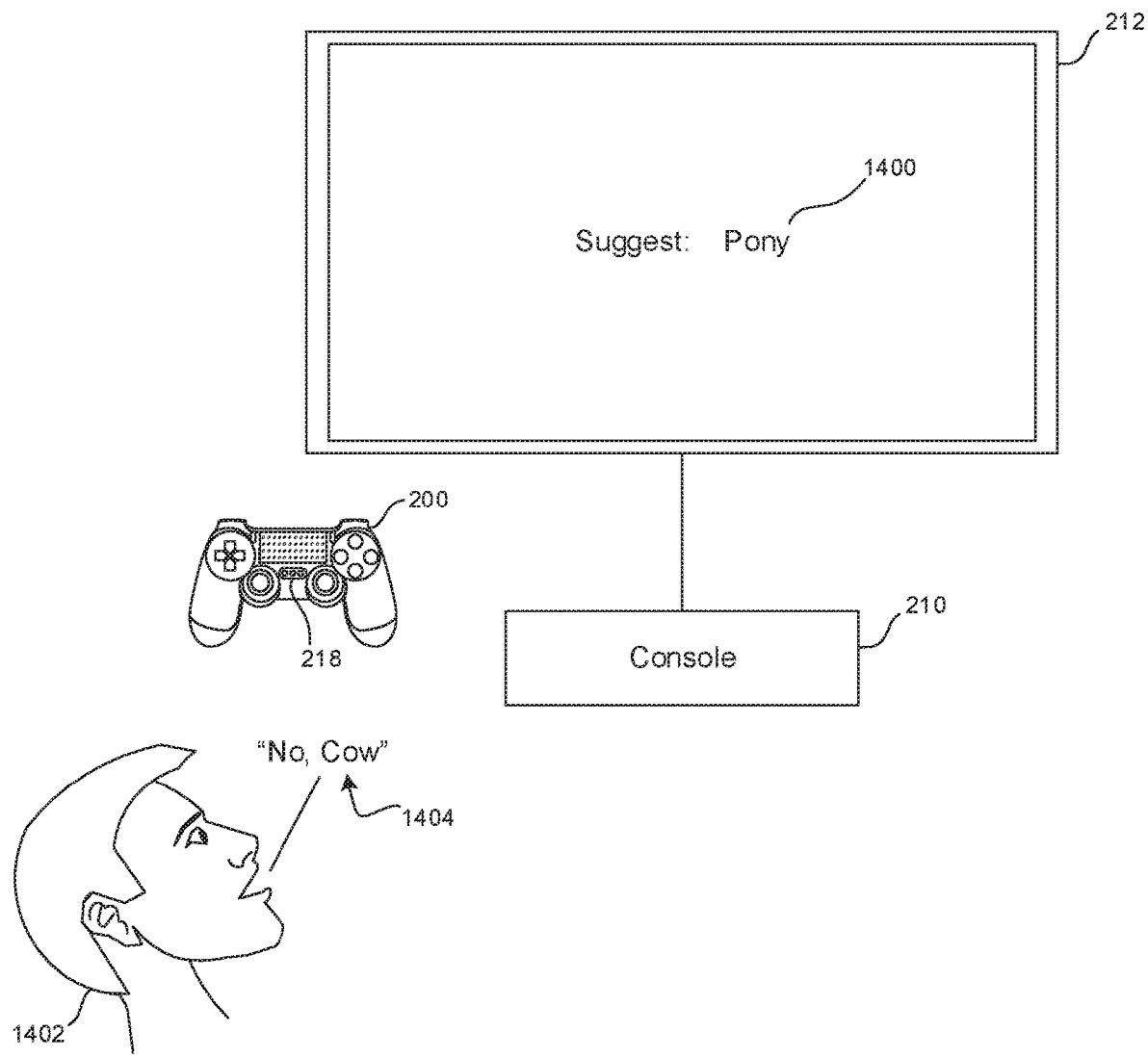
FIG. 14 is a schematic view of a system in which the microphone is used to input ground training to the neural networks contemporaneous with operation.

FIG. 14 illustrates using the components discussed above in relation to FIG. 2. A predicted word 1400 has been presented on the display 212 according to description above. A user 1402 may speak into the microphone 218 as indicated at 1404 whether to accept or reject the predicted word 1400 contemporaneous with operation. In the example shown, the predicted word is "pony", and the user 1402 has rejected it by speaking "no" into the microphone 218, which is digitized and provided as training data to the neural networks. The user 1402 has further input a correct word, in this case, "cow", which also is provided as ground truth for training the neural networks.

Figure 15:
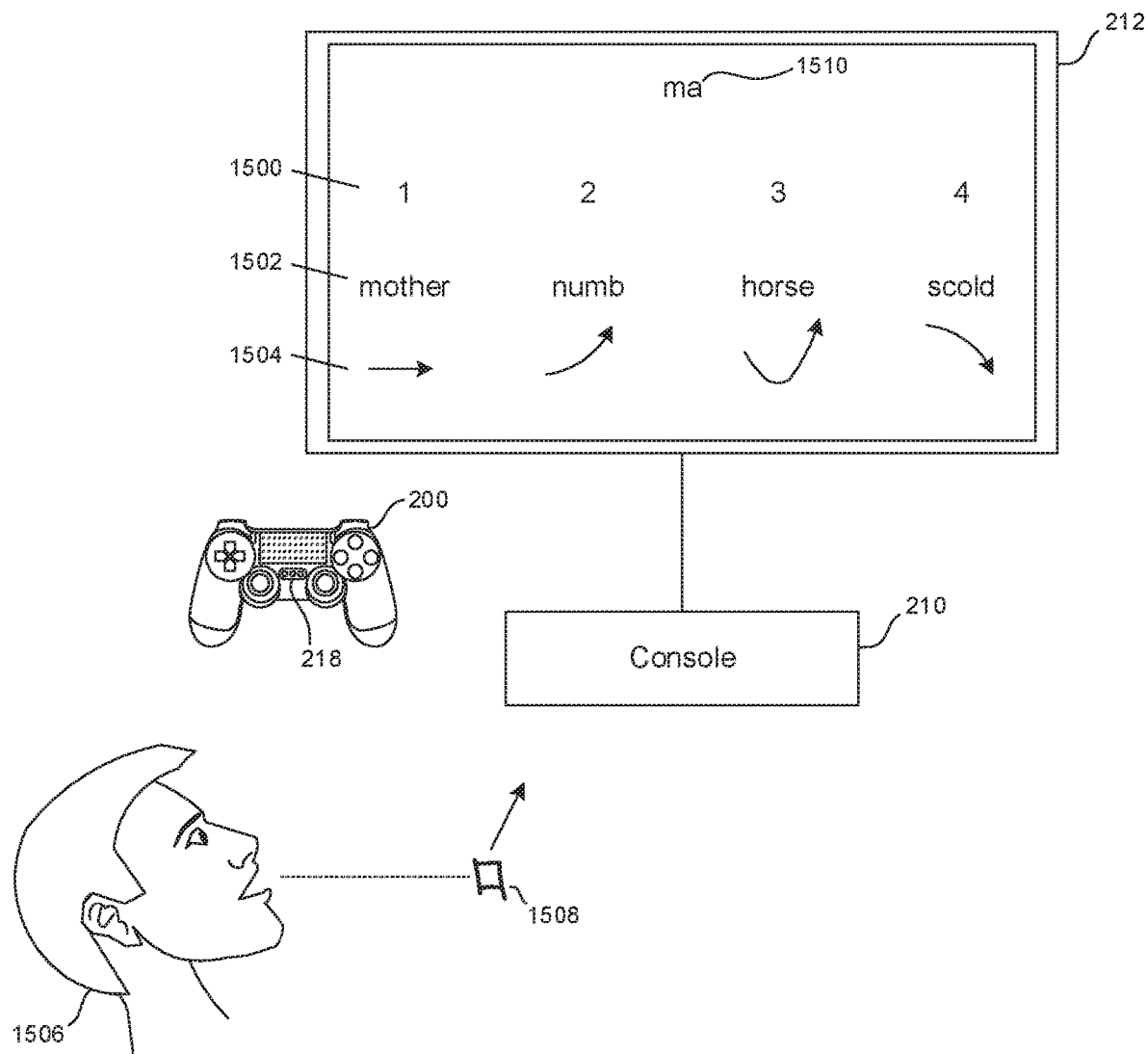
FIG. 15 is a schematic view of a system in which the microphone is used to input tones of Chinese characters to the neural networks contemporaneous with operation.

FIG. 15 illustrates a second use case for the microphone 218. In FIG. 15, assume that the user has typed in or the neural networks have predicted one or more Asian language characters such as Chinese Pinyin characters 1500 for presentation on the display 212. For illustration, the characters are simply numbered 1-4 in FIG. 15, and correspond to spoken words that may be rendered in English using identical Arabic letters, in the example shown, the letters "ma", and thus may be indistinguishable from each other when so rendered in English. Below each character 1500 the word 1502 it corresponds to in English is shown and below that, a respective symbol 1504 for the corresponding tone, it being understood that in implementation neither the word 1502 nor symbol 1504 may be presented. Note that while Chinese pinyin is used as an example of Asian language characters, present principles apply to other Asian languages such as Japanese in which the same Arabic letter string may be translated into two or more Asian language words differentiated from each other by tonal differences and not consonant or vowel differences.

A user 1506 may speak a word including an intended Asian language tone 1508 into the microphone 218, which is input to the processor(s) herein as the correct or ground truth tone. In the example shown, the user 1506 has spoken the word using the tone corresponding to the third character 1500, giving the character the meaning "horse". In this way, the user may have input, via the controller 200, the Arabic letters "ma" as indicated at 1510. The Arabic letters 1510 may be correlated to plural candidate Chinese words, which may be presented as respective Asian language characters if desired on the display 212. Tonal input from the microphone 218 is used to confirm and/or select which of the candidate characters words the user intended by typing in "ma", which may then be presented on the display in lieu of the other candidate words/symbols.

Figure 16:
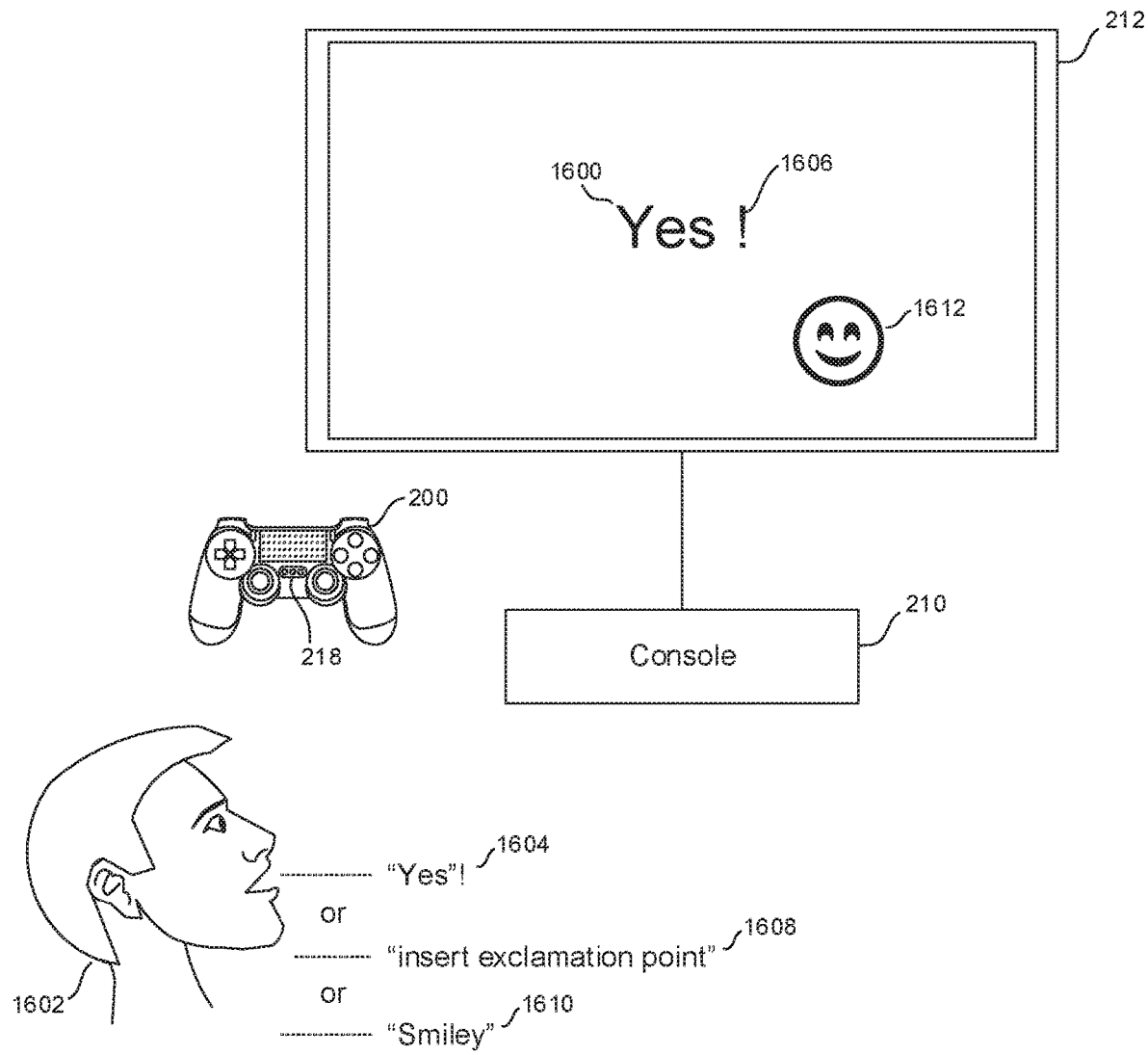
FIG. 16 is a schematic view of a system in which the microphone is used to input punctuation or graphics contemporaneous with operation.

FIG. 16 illustrates that during a touchpad swipe as described above, input from the microphone 218 may be used to input special characters/punctuations/graphics such as "smileys". Assume that the user has input, or the neural networks have predicted, a word 1600, in the example shown, the word "yes", that appears on the display 212. A user 1602 contemporaneously may speak the word 1600 with a tone that is detected by the neural networks to correspond to excitement as indicated at 1604, to cause an exclamation point 1606 to appear after the word 1600.

Or, the user may utter, as indicated at 1608, the name of the desired symbol or punctuation to cause the uttered symbol to be presented on the display 212. Yet again, the user may utter, as indicated at 1610, the name of a desired graphic symbol such as "smiley", to cause the uttered graphic symbol to be presented at 1612 on the display 212.

Figure 17:
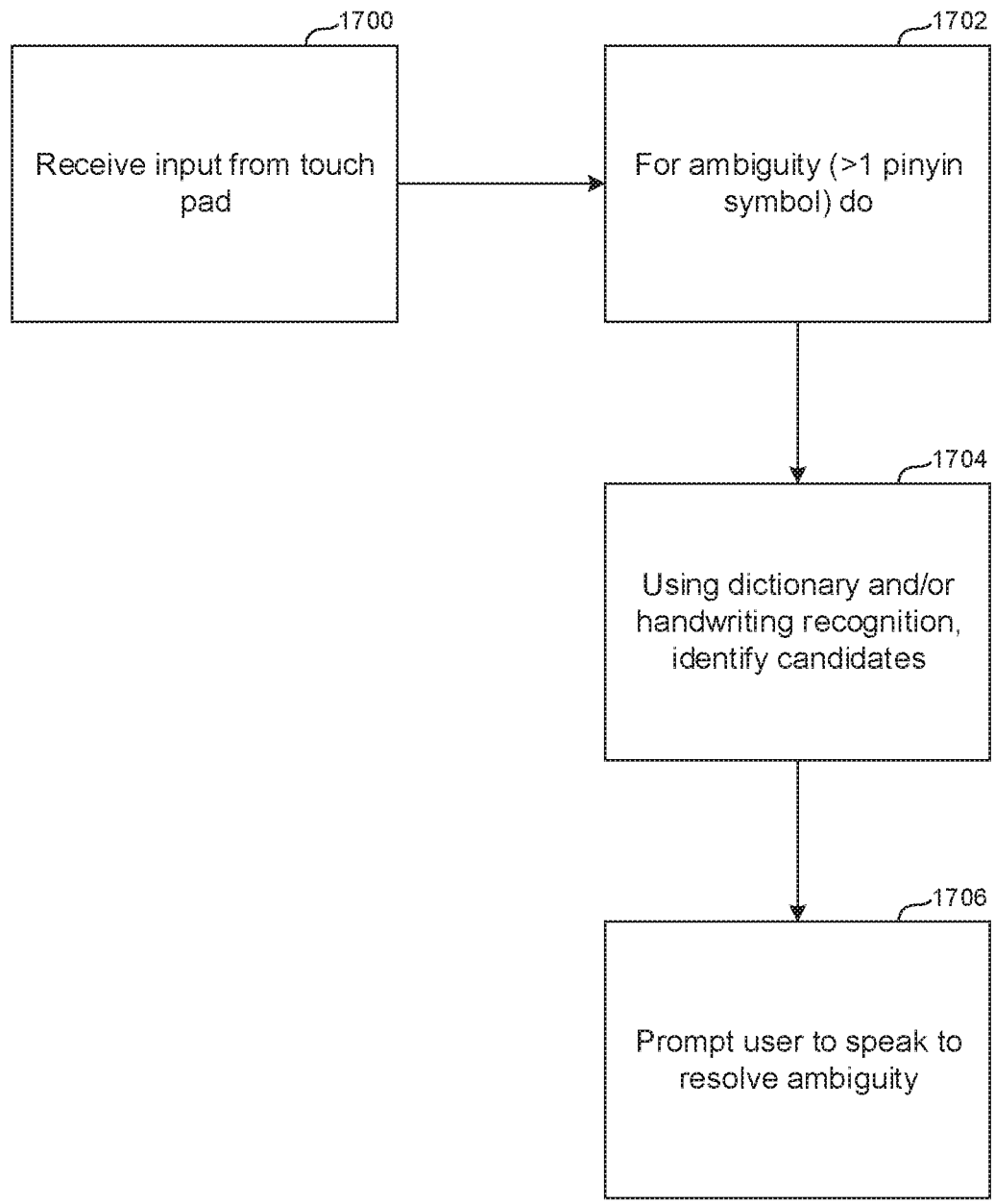
FIG. 17 is a flow chart of example logic consistent with FIG. 15.

FIG. 17 illustrates example logic consistent with FIG. 15. Commencing at block 1700, input may be received, e.g., from the touch pad of the controller or from other manipulable device, indicating Arabic letters and/or Chinese character(s). Block 1702 indicates that such input may be ambiguous in that it may correlate to more than one candidate Asian language word with corresponding symbol, in which case the logic flows to block 1704.

For instance, and using Chinese as an example, when input is received of Arabic letters, such as the letters "ma" discussed previously, more than one pinyin symbol (corresponding to more than one Chinese word) may be a candidate for the user's intent. Or, when touch input is received on the touch pad attempting to render a Chinese character, owing to imprecision in the touch tracing more than one Chinese character might be implicated.

At block 1704, using a dictionary (for example, correlating Arabic "ma" to the four pinyin characters described in reference to FIG. 15) the candidate pinyin symbols/corresponding Chinese words may be identified. In addition, or alternatively, handwriting recognition may be employed in the case of, e.g., an attempted trace of a Chinese character using the touch pad, to identify candidate Chinese characters that may fulfill the user's intent.

Proceeding to block 1706, a user may be prompted to speak to resolve the ambiguity and essentially select the user-preferred candidate symbol/word from block 1704. FIG. 15 illustrates a non-limiting example screen shot showing such a prompt.

It will be appreciated that whilst present principals have been described with reference to some example embodiments, these are not intended to be limiting, and that various alternative arrangements may be used to implement the subject matter claimed herein.

What is claimed is:
1. An apparatus, comprising:
at least one processor configured with instructions to:
receive a touch signal from a touch surface of a computer simulation controller to identify at least two Arabic letters;
input the Arabic letters to at least a first neural network (NN);
receive, from at least one microphone, input;
identify, using the Arabic letters, at least first and second candidate Chinese words; and
responsive to identifying a tone in the input from the microphone, select the first Chinese word but not the second Chinese word.
2. The apparatus of claim 1, wherein the processor and microphone are embodied in the computer simulation controller.
3. The apparatus of claim 1, wherein the processor is embodied in a computer simulation console configured for communicating with the computer simulation controller.
4. The apparatus of claim 1, wherein the instructions are executable to:
identify at least one punctuation symbol using the input from the microphone; and
responsive to identifying the punctuation symbol, present the punctuation symbol on the display.
5. The apparatus of claim 1, wherein the instructions are executable to:
identify at least one tone using the input from the microphone; and
responsive to identifying the tone, identify for presentation on the display at least one Chinese Pinyin character.
6. The apparatus of claim 1, wherein the first NN comprises plural long short-term memory (LSTM) networks.
7. An apparatus, comprising:
at least one computer storage that is not a transitory signal and that comprises instructions executable by the at least one processor to:
identify at least one tone using input from a microphone;
receive from a touch surface indication of at least two Arabic letters;
identify, using the Arabic letters, at least first and second candidate Asian language words; and
responsive to identifying the tone, select the first Asian language word but not the second Asian language word.
8. An apparatus, comprising:
at least one processor configured to:
receive from a touch surface indication of at least two Arabic letters;
identify, using the Arabic letters, at least first and second Chinese words; and
responsive to identifying a tone received in at least one signal from a microphone, select the first Chinese word but not the second Chinese word.
9. The apparatus of claim 8, wherein the instructions are executable to:
identify at least one tone using input from the microphone; and
responsive to identifying the tone, identify for presentation on the display at least one Chinese Pinyin character.
10. The apparatus of claim 8, wherein the instructions are executable to:

receive a touch signal from a touch surface, the touch surface being part of a computer simulation controller, to identify a first alpha-numeric character;

input the first alpha-numeric character to at least a first neural network (NN);

responsive to the input of the first alpha-numeric character, receive from the first NN a predicted sequence of alpha-numeric characters comprising at least a first predicted alpha-numeric character for presentation on at least one display;

receive, from the microphone, input indicating acceptance or rejection of at least the first predicted alpha-numeric character; and provide the input from the microphone to the first NN to train the first NN.

11. The apparatus of claim 10, wherein the first NN comprises plural long short-term memory (LSTM) networks.

12. The apparatus of claim 8, wherein the processor and microphone are embodied in a computer simulation controller.

13. A method comprising:

receiving from a touch surface indication of at least two Arabic letters;

identifying, using the Arabic letters, at least first and second Chinese words; and responsive to identifying a tone received in at least one signal from a microphone, selecting the first Chinese word but not the second Chinese word.

14. The method of claim 13, comprising:

identifying at least one tone using input from the microphone; and responsive to identifying the tone, identifying for presentation on the display at least one Chinese Pinyin character.

15. The method of claim 13, comprising:

receiving a touch signal from a touch surface, the touch surface being part of a computer simulation controller, to identify a first alpha-numeric character;

inputting the first alpha-numeric character to at least a first neural network (NN);

responsive to the input of the first alpha-numeric character, receiving from the first NN a predicted sequence of alpha-numeric characters comprising at least a first predicted alpha-numeric character for presentation on at least one display;

receiving, from the microphone, input indicating acceptance or rejection of at least the first predicted alpha-numeric character; and providing the input from the microphone to the first NN to train the first NN.

16. The method of claim 13, wherein the processor and microphone are embodied in a computer simulation controller.

17. The method of claim 15, wherein the first NN comprises plural long short-term memory (LSTM) networks.

* * * * *